United States Patent
Gilbert

(10) Patent No.: US 9,519,586 B2
(45) Date of Patent: Dec. 13, 2016

(54) METHODS AND APPARATUS TO REDUCE CACHE POLLUTION CAUSED BY DATA PREFETCHING

(71) Applicant: QUALCOMM Incorporated, San Diego, CA (US)

(72) Inventor: Matthew M. Gilbert, Raleigh, NC (US)

(73) Assignee: QUALCOMM Incorporated, San Diego, CA (US)

(*) Notice: Subject to any disclaimer, the term of this patent is extended or adjusted under 35 U.S.C. 154(b) by 324 days.

(21) Appl. No.: 13/746,000

(22) Filed: Jan. 21, 2013

(65) Prior Publication Data

US 2014/0208039 A1   Jul. 24, 2014

(51) Int. Cl.
*G06F 12/10* (2016.01)
*G06F 12/08* (2016.01)
(Continued)

(52) U.S. Cl.
CPC ....... *G06F 12/0862* (2013.01); *G06F 9/30065* (2013.01); *G06F 9/325* (2013.01);
(Continued)

(58) Field of Classification Search
CPC . G06F 12/0862; G06F 9/3455; G06F 9/30065
(Continued)

(56) References Cited

U.S. PATENT DOCUMENTS 6,260,116 B1   7/2001 Davis et al.
6,430,680 B1   8/2002 Burky et al.
(Continued)

FOREIGN PATENT DOCUMENTS

TW   201224749 A   6/2012
WO   0073897 A1   12/2000

OTHER PUBLICATIONS

Chen, W.Y., et al., "An Efficient Architecture for Loop Based Data Preloading", Microarchitecture, 1992. Micro 25., Proceedings Ofthe 25th Annual International Symposium on Portland, OR, USA Dec. 1-4, 1992, Los Alamitos, CA, USA, IEEE Comput. Soc, US, Dec. 1, 1992 (Dec. 1, 1992)-Dec. 4, 1992 (Dec. 4, 1992), pp. 92-101, XP010094775, DOI: 10.1109/MICR0.1992.697003 ISBN: 978-0-8186-3175-7, the whole document.
(Continued)

*Primary Examiner* — Jae Yu
(74) *Attorney, Agent, or Firm* — Muncy, Geissler, Olds & Lowe, P.C.

(57) ABSTRACT

Efficient techniques are described for reducing cache pollution by use of a prefetch logic that recognizes exits from software loops or function returns to cancel any pending prefetch request operations. The prefetch logic includes a loop data address monitor to determine a data access stride based on repeated execution of a memory access instruction in a program loop. Data prefetch logic then speculatively issues prefetch requests according to the data access stride. A stop prefetch circuit is used to cancel pending prefetch requests in response to an identified loop exit. The prefetch logic may also recognize a return from a called function and cancel any pending prefetch request operations associated with the called function. When prefetch requests are canceled, demand requests, such as based on load instructions, are not canceled. This approach to reduce cache pollution uses program flow information to throttle data cache prefetching.

20 Claims, 4 Drawing Sheets

(51) Int. Cl.
*G06F 9/30* (2006.01)
*G06F 9/32* (2006.01)
*G06F 9/345* (2006.01)
*G06F 9/38* (2006.01)

(52) U.S. Cl.
CPC ............ *G06F 9/3455* (2013.01); *G06F 9/383* (2013.01); *G06F 9/3832* (2013.01)

(58) Field of Classification Search
USPC ........................................................ 711/137
See application file for complete search history.

(56) References Cited

U.S. PATENT DOCUMENTS

| | | | |
|---|---|---|---|
| 6,446,143 B1 * | 9/2002 | Razdan | ................ G06F 9/3802 710/29 |
| 6,775,765 B1 * | 8/2004 | Lee et al. | ..................... 712/241 |
| 7,480,769 B2 | 1/2009 | Diefendorff et al. | |
| 7,526,604 B1 | 4/2009 | Danilak | |
| 2008/0010444 A1 | 1/2008 | Hammes | |
| 2009/0307433 A1 | 12/2009 | Jones et al. | |
| 2012/0066456 A1 | 3/2012 | Rabinovitch et al. | |
| 2012/0072702 A1 | 3/2012 | Pierson et al. | |

OTHER PUBLICATIONS

International Search Report and Written Opinion—PCT/US2014/012152—ISA/EPO—Apr. 17, 2014.
Taiwan Search Report—TW103102149—TIPO—Jun. 4, 2015.

* cited by examiner

METHODS AND APPARATUS TO REDUCE CACHE POLLUTION CAUSED BY DATA PREFETCHING

FIELD OF THE DISCLOSURE

The present disclosure relates generally to aspects of processing systems and in particular to methods and apparatus to reduce cache pollution caused by data prefetching.

BACKGROUND

Many portable products, such as cell phones, laptop computers, personal data assistants (PDAs) and the like, utilize a processing system that executes programs, such as communication and multimedia programs. A processing system for such products may include multiple processors, complex memory systems including multi-levels of caches for storing instructions and data, controllers, peripheral devices such as communication interfaces, and fixed function logic blocks configured, for example, on a single chip. At the same time, portable products have a limited energy source in the form of batteries that are often required to support high performance operations by the processing system. To increase battery life, it is desirable to perform these operations as efficiently as possible. Many personal computers are also being developed with efficient designs to operate with reduced overall energy consumption.

In order to provide high performance in the execution of programs, data prefetching may be used that is based on the concept of spatial locality of memory references and is generally used to improve processor performance. By prefetching multiple data elements from a cache at addresses that are near to a fetched data element or are related by a stride address delta or an indirect pointer, and that are likely to be used in future accesses, cache miss rates may be reduced. Cache designs generally implement a form of prefetching by fetching a cache line of data for an individual data element fetch. Hardware prefetchers may expand on this by speculatively prefetching one or more additional cache lines of data, where the prefetch addressing may be formed based on, sequential, stride, or pointer information. Such hardware prefetcher operation for memory intensive workloads, such as processing a large array of data, may significantly reduce memory latency. However, data prefetching is not without its drawbacks. For example, in a software loop used to process an array of data, a data prefetcher circuit prefetches data to be used in future iterations of the loop including the last iteration of the loop. However, the data prefetched for the last iteration of the loop will not be used and cache pollution occurs by storing this data that will not be used in the cache. The cache pollution problem is compounded when loops are unrolled.

SUMMARY

Among its several aspects, the present disclosure recognizes that providing more efficient methods and apparatuses for prefetching can improve performance and reduce power requirements in a processor system. To such ends, an embodiment of the invention addresses a method for canceling prefetch requests. A loop exit situation is identified based on an evaluation of program flow information. Pending cache prefetch requests are canceled in response to the identified loop exit situation.

Another embodiment addresses a method for canceling prefetch requests. Data is speculatively prefetched according to a called function. Pending data prefetch requests are canceled in response to a function exit from the called function.

Another embodiment addresses an apparatus for canceling prefetch requests. A loop data address monitor is configured to determine a data access stride based on repeated execution of a memory access instruction in a program loop. Data prefetch logic is configured to speculatively issue prefetch requests according to the data access stride. A stop prefetch circuit is configured to cancel pending prefetch requests in response to an identified loop exit.

Another embodiment addresses a computer readable non-transitory medium encoded with computer readable program data and code. A loop exit situation is identified based on an evaluation of program flow information. Pending cache prefetch requests are canceled in response to the identified loop exit situation.

A further embodiment addresses an apparatus for canceling prefetch requests. Means is utilized for determining a data access stride based on repeated execution of a memory access instruction in a program loop. Means is utilized for speculatively issuing prefetch requests according to the data access stride. Means is also utilized for canceling pending prefetch requests in response to an identified loop exit.

It is understood that other embodiments of the present invention will become readily apparent to those skilled in the art from the following detailed description, wherein various embodiments of the invention are shown and described by way of illustration. As will be realized, the invention is capable of other and different embodiments and its several details are capable of modification in various other respects, all without departing from the spirit and scope of the present invention. Accordingly, the drawings and detailed description are to be regarded as illustrative in nature and not as restrictive.

BRIEF DESCRIPTION OF THE DRAWINGS

Various aspects of the present invention are illustrated by way of example, and not by way of limitation, in the accompanying drawings, wherein.

DETAILED DESCRIPTION

The detailed description set forth below in connection with the appended drawings is intended as a description of various exemplary embodiments of the present invention and is not intended to represent the only embodiments in which the present invention may be practiced. The detailed description includes specific details for the purpose of providing a thorough understanding of the present invention. However, it will be apparent to those skilled in the art that the present invention may be practiced without these specific details. In some instances, well known structures and components are shown in block diagram form in order to avoid obscuring the concepts of the present invention.

Figure 1:
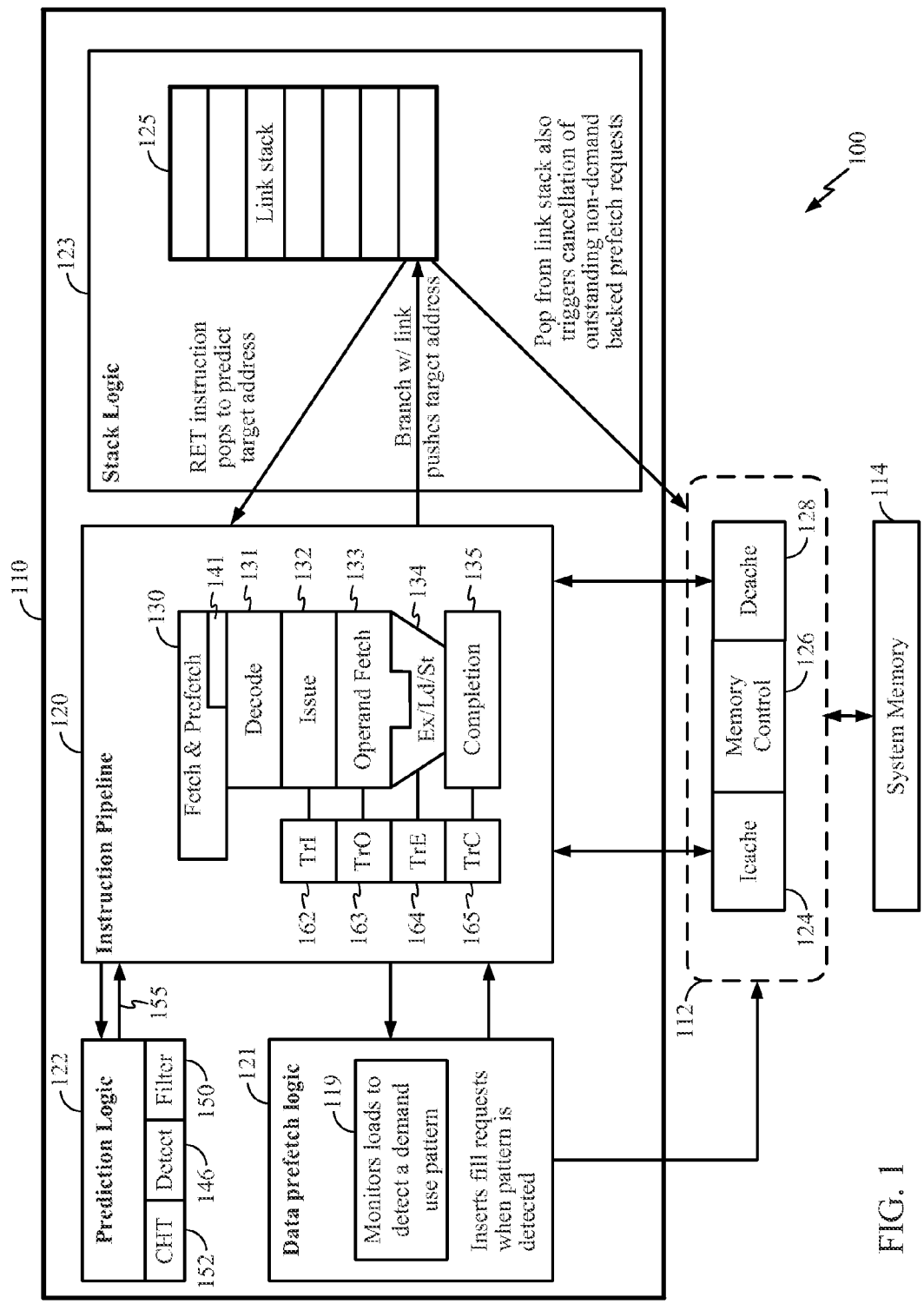
FIG. 1 illustrates an exemplary processor system in which an embodiment of the invention may be advantageously employed.

FIG. 1 illustrates an exemplary processor system 100 in which an embodiment of the invention is advantageously employed. The processor system 100 includes a processor 110, a cache system 112, a system memory 114, and an input and output (I/O) system 116. The cache system 112, for example, comprises a level 1 instruction cache (Icache) 124, a memory controller 126, and a level 1 data cache (Dcache) 128. The cache system 112 may also include a level 2 unified cache (not shown) or other cache components as desired for a particular implementation environment. The system memory 114 provides access for instructions and data that are not found in the Icache 124 or Dcache 128. It is noted that the cache system 112 may be integrated with processor 110 and may also include multiple levels of caches in a hierarchical organization. The I/O system 116 comprises a plurality of I/O devices, such as I/O devices 140 and 142, which interface with the processor 110.

Embodiments of the invention may be suitably employed in a processor having conditional branching instructions. The processor 110 comprises, for example, an instruction pipeline 120, data prefetch logic 121, prediction logic 122, and a stack logic circuit 123. The instruction pipeline 120 is made up of a series of stages, such as, a fetch and prefetch stage 130, decode stage 131, instruction issue stage 132, operand fetch stage 133, execute stage 134, such as for execution of load (Ld) and store (St) instructions, and completion stage 135. Those skilled in the art will recognize that each stage 130-135 in the instruction pipeline 120 may comprise a number of additional pipeline stages depending upon the processor's operating frequency and complexity of operations required in each stage. For example, the execute stage 134 may include one or more pipeline stages corresponding to one or more instruction execution stage circuits, such as an adder, a multiplier, logic operations, load and store operations, shift and rotate operations, and other function circuits of greater or less complexity. For example, when a load instruction is executed, it requests data from the Dcache 128 and if the requested data is not present in the Dcache a fetch request is issued to the next level of cache or system memory. Such a fetch request is considered a demand request since it is in direct response to execution of an instruction, in this case a load instruction.

A prefetch request is a request that is made in response to program flow information, such as detection of a program loop having one or more load instructions in the loop with load addresses based on a stride, for example. The data prefetch logic 121 utilizes such program flow information which may be based on a number of iterations of the detected loop to more accurately identify a demand use pattern of the operand addresses of the load instructions before issuing a prefetch request. Fill requests are inserted when a pattern is detected. The processor 110 may operate to differentiate a demand request from a prefetch request by use of an extra flag associated with the request that is tracked in the processor pipeline. This flag could also propagate with the request to the cache where each outstanding cache line fill could be identified as either a prefetch or demand fill. Each of the pipeline stages may have varied implementations without departing from the prefetch request canceling methods and apparatus described herein.

In order to minimize delays that could occur if data required by a program were not in the associated level 1 Dcache 128, the fetch and prefetch stage 130 records program flow information associated with one or more memory access instructions which execute in a detected program loop. Program information may include an indication from the decode stage 131 that a load instruction has been received and operand address information for the load instruction may be available at a pipeline stage prior to execution, such as operand fetch stage 133 or at the execute stage 134. The data prefetch logic 121 monitors the load addresses as they become available to detect a pattern. After the pattern is determined with an acceptable level of confidence, such as by monitoring load instructions through three or more iterations of a loop, a prefetch request for expected data is issued prior to when the load instruction is encountered again in the loop. This speculative prefetch request ensures the required data is available in the level 1 Dcache when needed by the execute stage 134. The load and store execute stage 134 is then more likely to access the required data directly from the level 1 Dcache without having to wait to access the data from higher levels in the memory hierarchy.

The data prefetch logic 121 may also include a data cache loop data address monitor to determine a data access stride. The data prefetch logic 121 then speculatively issues prefetch requests with operand addresses set according to the data access stride. For example, the data prefetch logic 121 may include a stride circuit 119 that is configured to monitor repeated executions of a load instruction to determine a difference between the operand address of each execution of the load instruction that represents a stride value. The stride circuit 119 may also include an add function that is configured to add the determined stride value to the operand address of the most recently executed load instruction to generate the next operand address. In contrast to the stride value as a predicted address, a fetched conditional branch instruction uses branch prediction logic, such as contained in the prediction logic circuit 122, to predict whether the conditional branch will be taken and the branch address. A fetched non-branch instruction proceeds to the decode stage 131 to be decoded, issued for execution in the instruction issue stage 132, executed in execute stage 134, and retired in completion stage 135.

The prediction logic circuit 122 comprises a detection logic circuit 146 for monitoring events, a filter 150, and a conditional history table 152. In one embodiment, it is assumed that a majority of conditional branch instructions generally have their conditions resolved to the same value for most iterations of a software loop.

Figure 2A:
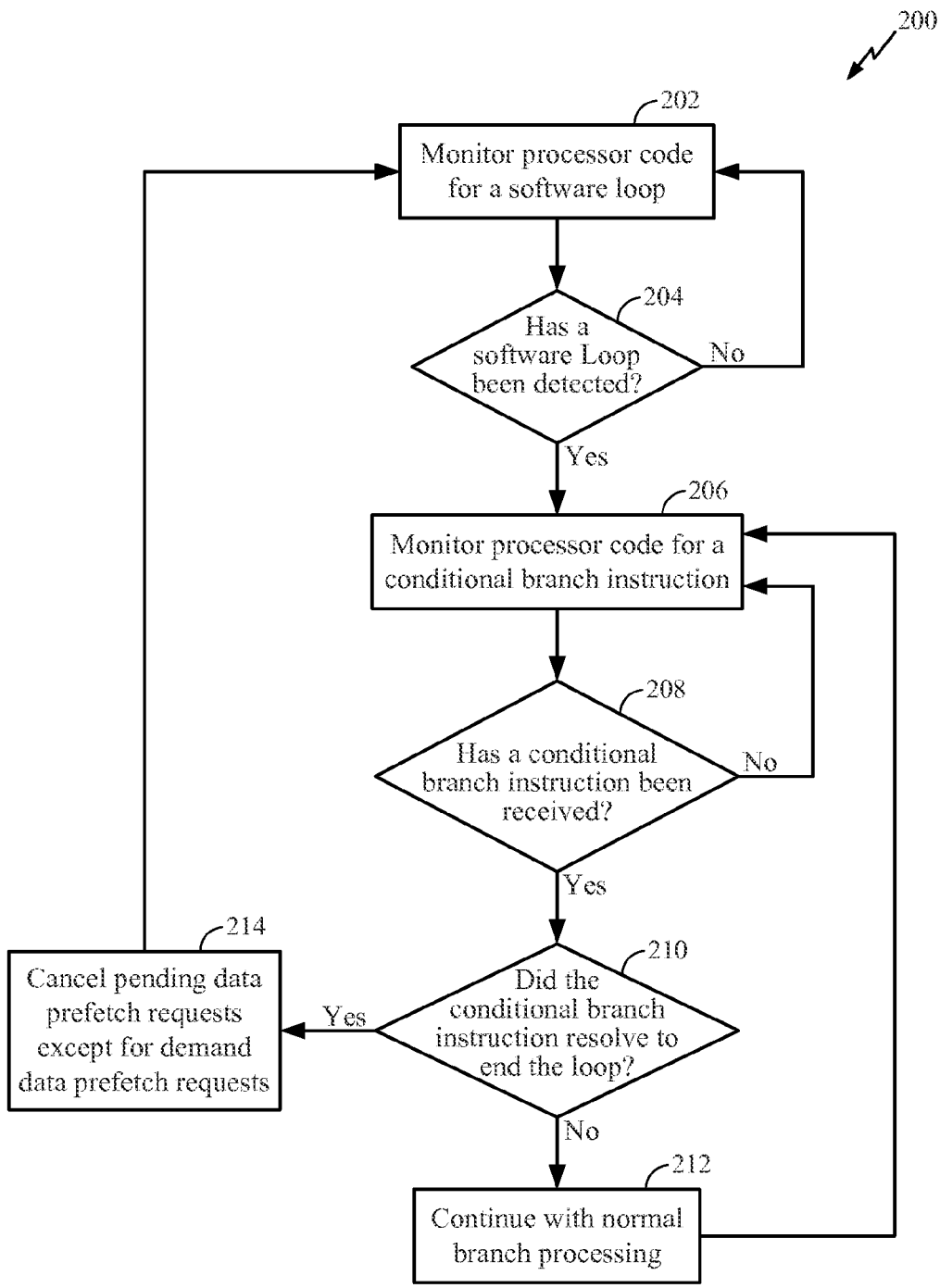
FIG. 2A illustrates a process for canceling pending non-demand data prefetch requests upon detecting a loop-ending branch.

The detection logic circuit 146, in one embodiment, acts as a software loop detector that operates based on the dynamic characteristics of conditional branch instructions used in software loops as described with regard to FIG. 2A. The detection logic circuit 146 may also detect exits from called software functions, as described with regard to FIG. 2B.

In software loops with a single entry and a single exit, a loop ending branch is generally a conditional branch instruction which branches back to the start of the software loop for all iterations of the loop except for the last iteration, which exits the software loop. The detection logic circuit 146 may have multiple embodiments for the detection of software loops as described in more detail below and in U.S. patent application Ser. No. 11/066,508 assigned to the assignee of the present application, entitled "Suppressing Update of a Branch History Register by Loop-Ending Branches," which is incorporated by reference herein in its entirety.

According to one embodiment, the detection logic circuit 146 identifies conditional branch instructions with a branch target address less than the conditional branch instruction address, and thus considered a backwards branch, and is assumed to mark the end of a software loop. Since not all backward branches are loop ending branches, there is some level of inaccuracy which may need to be accounted for by additional monitoring mechanisms, for example.

Figure 2B:
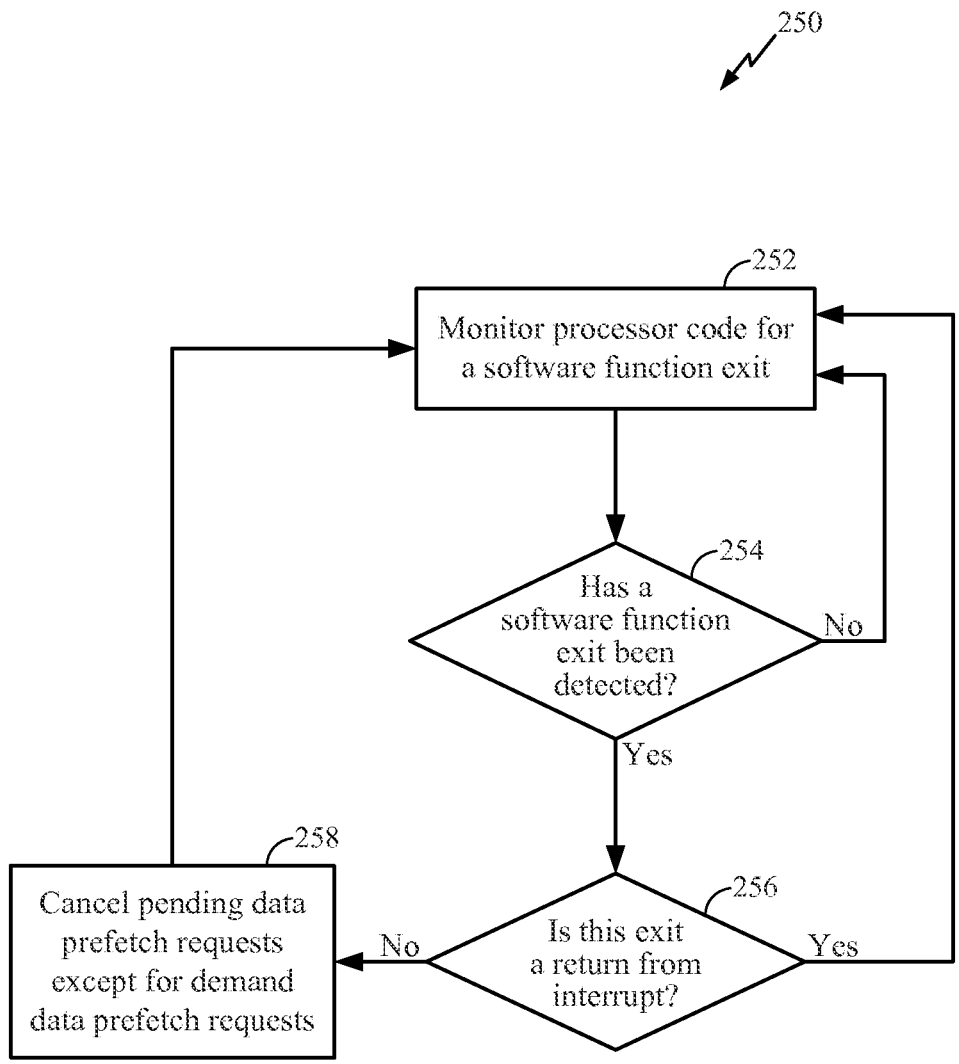
FIG. 2B illustrates a process for canceling pending non-demand data prefetch requests upon detecting a function return.

Also, as described with regard to FIG. 2B, a function return instruction (commonly named RET) can be detected. According to one embodiment, the detection of a function return is adapted to trigger prefetch cancellations of any non-demand prefetch requests. Cancellation of a prefetch request is also made in response to program flow information, such as detection of a loop exit.

In another embodiment, a loop ending branch may be detected in simple loops by recognizing repeated execution of the same branch instruction. By storing the program counter value for the last backward branch instruction in a special purpose register, and comparing this stored value with the instruction address of the next backward branch instruction, a loop ending branch may be recognized when the two instruction addresses match. Since code may include conditional branch instructions within a software loop, the determination of the loop ending branch instruction may become more complicated. In such a situation, multiple special purpose registers may be instantiated in hardware to store the instruction addresses of each conditional branch instruction. By comparing against all of the stored values, a match can be determined for the loop ending branch. Typically, loop branches are conditional backward direct branches having a fixed offset from the program counter (PC). These types of branches would not need address comparisons for detection of a loop exit. Instead, once a program loop is detected based on a conditional backward direct branch, the loop exit is determined from resolution of branch's predicate. For example, if the predicate resolves to a true condition for returning to the loop, then the loop exit would be indicated when the predicate resolves to a false condition. In order for there to be pending prefetches, a program loop would have already executed a few times to trigger the prefetch hardware. The data prefetch logic 121 requires a few warmup demand loads to recognize a pattern before it starts prefetching.

Also, a loop ending branch may be statically marked by a compiler or assembler. For example, in one embodiment, a compiler generates a particular type of branch instruction, by use of a unique opcode or by setting a special format bit field, that is only used for loop ending branches. The loop ending branch may then be easily detected during pipeline execution, such as during a decode stage in the pipeline.

The prediction logic circuit 122 comprises a filter 150, a conditional history table (CHT) 152, and associated monitoring logic. In one embodiment, a monitoring process saves state information of pre-specified condition events which have occurred in one or more prior executions of a software loop having a conditional branch instruction that is eligible for prediction. In support of the prediction logic circuit 122, the filter 150 determines whether a fetched conditional branch instruction has been received and the CHT 152 is enabled. An entry in the CHT 152 is selected to provide prediction information that is tracked, for example, by the pipeline stages 132-135 as instructions moves through the pipeline.

The CHT 152 entry records the history of execution for the fetched instruction eligible for predicted execution. For example, each CHT entry may suitably comprise a combination of count values from execution status counters and status bits that are inputs to the prediction logic. The CHT 152 may also comprise index logic to allow a fetched conditional branch instruction to index into an entry in the CHT 152 associated with the fetched instruction, since multiple conditional branch instructions may exist in a software loop. For example, by counting the number of conditional branch instructions from the top of a software loop, the count may be used as an index into the CHT 152. The prediction logic circuit 122 includes loop counters for counting iterations of software loops and ensuring that execution status counters have had the opportunity to saturate at a specified count value that represents, for example, a strongly not-executed status. If an execution status counter has saturated, the prediction logic is enabled to make a prediction for branch direction of the associated fetched conditional branch instruction on the next iteration of the loop.

The prediction logic circuit 122 generates prediction information that is tracked at the instruction issue stage 132, the operand fetch stage 133, the execute stage 134, and the completion stage 135 in track register issue (TrI) 162, track register operand fetch 163, track register execute (TrE) 164, and track register complete (TrC) 165, respectively. When a conditional backward branch with a failed predicate indicating the end of the loop, or a function return, is detected such as during the execute stage 134 in the processor pipeline, a cancel pending prefetch requests signal 155 is generated. In another embodiment, pending prefetch requests are canceled based on a conditional branch prediction generated by branch prediction logic. Each conditional branch is generally predicted by the branch prediction logic to take or not take the conditional branch. For example, where the prediction information indicates the conditional branch is taken, which in this example continues a program loop, the instruction fetcher speculatively fetches instructions on the program loop indicated by the prediction. The prediction information is also coupled to a cancel pending prefetch request logic circuit 141 which may reside in the fetch & prefetch circuit 130. The cancel pending prefetch request logic circuit 141 may then speculatively cancel pending prefetch requests based program flow information indicating the pending prefetch requests are not needed. For example, the processor may be configured to not cancel pending prefetch requests based on a weakly predicted loop exit. By canceling one or more pending data prefetch requests, data cache pollution is reduced and power utilized to address such pollution is reduced in the processor 110. The cancel pending prefetch request signal 155 is coupled to the processor instruction pipeline 120 as shown in FIG. 1 and is accepted by the cancel pending prefetch request logic circuit 141 which causes prefetch requests that are pending, except for demand prefetch requests, to be canceled. Also, processor performance is improved by not storing unnecessary data in the data cache which may have evicted data that would have been fetched and now a miss is generated instead.

Upon reaching the execute stage 134, if the execute condition specified for the loop ending conditional branch instruction has evaluated opposite to its prediction, any pipeline speculative execution of instructions on the wrong instruction path are corrected, for example by flushing the pipeline, and such a correction may include canceling pending prefetches that are associated with the wrong instruction path. For example, in one embodiment a correction to the pipeline includes flushing the instructions in the pipeline beginning at the stage the prediction was made. In an alternative embodiment, the pipeline is flushed from the beginning fetch stage where the loop ending conditional branch instruction was initially fetched. Also, the appropriate CHT entry may also be corrected after an incorrect prediction.

The detection circuit 146, acting as a loop detector, operates to detect a loop ending branch. For example, a loop ending branch is generally a conditional branch instruction which branches back to the start of the loop for all iterations of the loop except for the last iteration which exits the loop. Information concerning each identified loop is passed to filter circuit 150 and upon a loop exit situation a cancel pending prefetch request logic circuit 141 cancels pending non-demand prefetch requests in response to each identified loop exit.

In one embodiment, the filter circuit 150, for example, is a loop counter which provides an indication that a set number of iterations of a software loop has occurred, such as three iterations of a particular loop. For each iteration of the loop, the filter determines if a conditional branch instruction is eligible for prediction. If an eligible conditional branch (CB) instruction is in the loop, the status of executing the CB instruction is recorded in the conditional history table (CHT) circuit 152. For example, an execution status counter may be used to record an execution history of previous attempted executions of an eligible CB instruction. An execution status counter is updated in a one direction to indicate the CB instruction conditionally executed and in an opposite direction to indicate the CB instruction conditionally did not execute. For example, a two bit execution status counter may be used where a not-executed status causes a decrement of the counter and an executed status causes an increment of the counter. Output states of the execution status counter are, for example, assigned an output of "11" to indicate that previous CB instructions are strongly indicated to have been executed, an output of "10" to indicate that previous CB instructions are weakly indicated to have been executed, an output of "01" to indicate that previous CB instructions are weakly indicated to have been not executed, and an output of "00" to indicate that previous CB instructions are strongly indicated to have been not executed. The execution status counter "11" output and "00" output would be saturated output values. An execution status counter would be associated with or provide status for each CB instruction in a detected software loop. However, a particular implementation may limit the number of execution status counters that are used in the implementation and thus limit the number of CB instructions that are predicted. The detection circuit 146 generally resets the execution status counters upon the first entry into a software loop.

Alternatively, a disable prediction flag may be associated with each CB instruction to be predicted rather than an execution status counter. The disable prediction flag is set active to disable prediction if an associated CB instruction has previously been determined to have executed. Identifying a previous CB instruction that executed implies that the confidence level for predicting a not execute situation for the CB instruction would be lower than an acceptable level.

An index counter may also be used with the CHT 152 to determine which CB instruction is being counted or evaluated in the software loop. For example, in a loop having five or more CB instructions, the first CB instruction could have an index of "000" and the fourth eligible conditional branch instruction could have an index of "011". The index represents an address into the CHT 152 to access the stored execution status counter values for the corresponding CB instruction.

The prediction circuit 122 receives the prediction information for a particular CB instruction, such as execution status counter output values, and predicts, during the decode stage 131 of FIG. 1, for example, that the CB instruction will generally branch back to the software loop beginning and not predict a loop exit situation is reached. In one embodiment, the prediction circuit 122 may predict that the condition specified by the CB instruction evaluates to a no branch state, code exits or falls through the loop. The prediction circuit 122 tracks the CB instruction. If a CB instruction is predicted to branch back to the loop beginning, the prediction information indicates such status. If a CB instruction was determined to not branch back, then a tracking circuit generates a cancel pending prefetch request signal and a condition evaluation is made to determine if an incorrect prediction was made. If an incorrect prediction was made, the pipeline may also be flushed, the appropriate execution status counters in the CHT 152 are updated, and in one embodiment the associated CHT entry is marked to indicate that this particular CB instruction is not to be predicted from this point on. In another embodiment, the prediction logic circuit 122 may also change the pre-specified evaluation criterion upon determining the CB instruction was mispredicted, for example, to make the prediction criterion more conservative from this point on.

It is further recognized that not all loops have similar characteristics. If a particular loop provides poor prediction results, that loop is marked in the prediction logic circuit 122 to disable prediction. In a similar manner, a particular loop may operate with good prediction under one set of operating scenarios and may operate with poor prediction under a different set of operating scenarios. In such a case, recognition of the operating scenarios allows prediction to be enabled, disabled or enabled but with different evaluation criterion appropriate for the operating scenario.

FIG. 2A illustrates a process 200 for canceling pending non-demand data prefetch requests upon detecting a loop-ending branch. At block 202, processor code execution is monitored for a software loop. At decision block 204, a determination is made whether a software loop has been detected. A software loop may be determined, for example, by identifying a backward branch to a location representing the start of the software loop on a first pass through the software loop, as described above. If no software loop has been identified, the process 200 returns to block 202. If a software loop has been identified then the process 200 proceeds to block 206. At this point in the code, a first cycle of the software loop has already been executed and the next cycle of the software loop is ready to start.

In the next cycle of the software loop at block 206, the processor code is monitored for a CB instruction. At decision step 208 a determination is made whether a CB instruction has been detected, for example, during a pipeline decode stage, such as decode stage 131 of FIG. 1. If no CB instruction has been detected, the process 200 returns to block 206. If a CB instruction has been detected, the process 200 proceeds to decision block 210. At decision block 210, a determination is made whether the conditional branch (CB) instruction resolved to end the loop, based on an evaluation of the conditional predicate, for example. There are a number of types of CB instruction evaluations that may have been detected. For example, a first evaluation of the detected CB instruction could be resolved that the CB instruction is at the end of the software loop, but evaluates to continue loop processing. The backward branching CB instruction that identified the software loop in the first pass through the software loop is tagged by its address location in the processor code, for example. Also, for the case that a number of specified iterations of the software loop have not been completed, the CB instruction resolves to branch the processor back to the beginning of the software loop. A second evaluation of the detected CB instruction could be resolved that the CB instruction is at the end of the software loop and evaluates to end the software loop. A third evaluation of the detected CB instruction could be resolved that the CB instruction is within the software loop, but when evaluated as taken or not taken, the processor code remains in the software loop. Also, a fourth evaluation of the CB instruction could be resolved that the CB instruction is within the software loop, but when evaluated as taken or not taken, the processor code exits the software loop. In the fourth evaluation, a CB instruction that is within the software loop, but resolves as a forward branch past the address location of the backward branching CB instruction is considered to have exited the software loop.

Returning to decision block 210, if the detected CB instruction did not resolve to exit the software loop, as in the first and third evaluations of the CB instruction, the process 200 proceeds to block 212. At block 212, the process 200 continues with normal branch processing and then returns to block 206. If the detected CB instruction did resolve to exit the software loop, as in the second and fourth evaluations of the CB instruction, the process 200 proceeds to block 214. At block 214, the process 200 cancels pending data prefetch requests except for demand data prefetch requests, processes the CB instruction, and returns to block 202 to begin searching for the next software loop.

FIG. 2B illustrates a process 250 for canceling pending non-demand data prefetch requests upon detecting a function return. At block 252, processor code execution is monitored for a software function exit. It is noted that the software function may be speculatively executed. For example, speculative execution may occur for a function call in a software loop. In the case of speculative execution of the software function, the software function exit, such as execution of a RET instruction, may also be speculatively executed. At decision block 254, a determination is made whether a software function exit has been detected, such as by detecting a return instruction in a processor's execution pipeline. If no software function exit has been detected, the process 250 returns to block 252.

If a software function exit has been detected, the process 250 proceeds to decision block 256. At decision block 256, a determination is made whether this detected exit situation is a return from an interrupt routine. If the detected exit is a return from an interrupt routine, then the process 250 returns to block 252. If the detected exit is not a return from an interrupt routine, the process 250 proceeds to block 258. At block 258, the process 250 cancels pending data prefetch requests except for demand data prefetch requests, processes the return instruction, and then returns to block 252 to continue monitoring processor code for a software function exit.

Frequently, either by hand or through compiler optimizations, a software loop will be unrolled such that multiple iterations of the loop are executed sequentially. This sequential execution of each unrolled iteration becomes an additional prefetch candidate. On the last iteration of the loop, each unrolled candidate can then generate unneeded prefetch requests compounding the problem of prefetched data cache pollution. An embodiment of the invention also applies to loop unrolling by detecting the exit of the loop, or the return from a function, and cancelling all of the unneeded prefetch requests from each unrolled loop.

Figure 3:
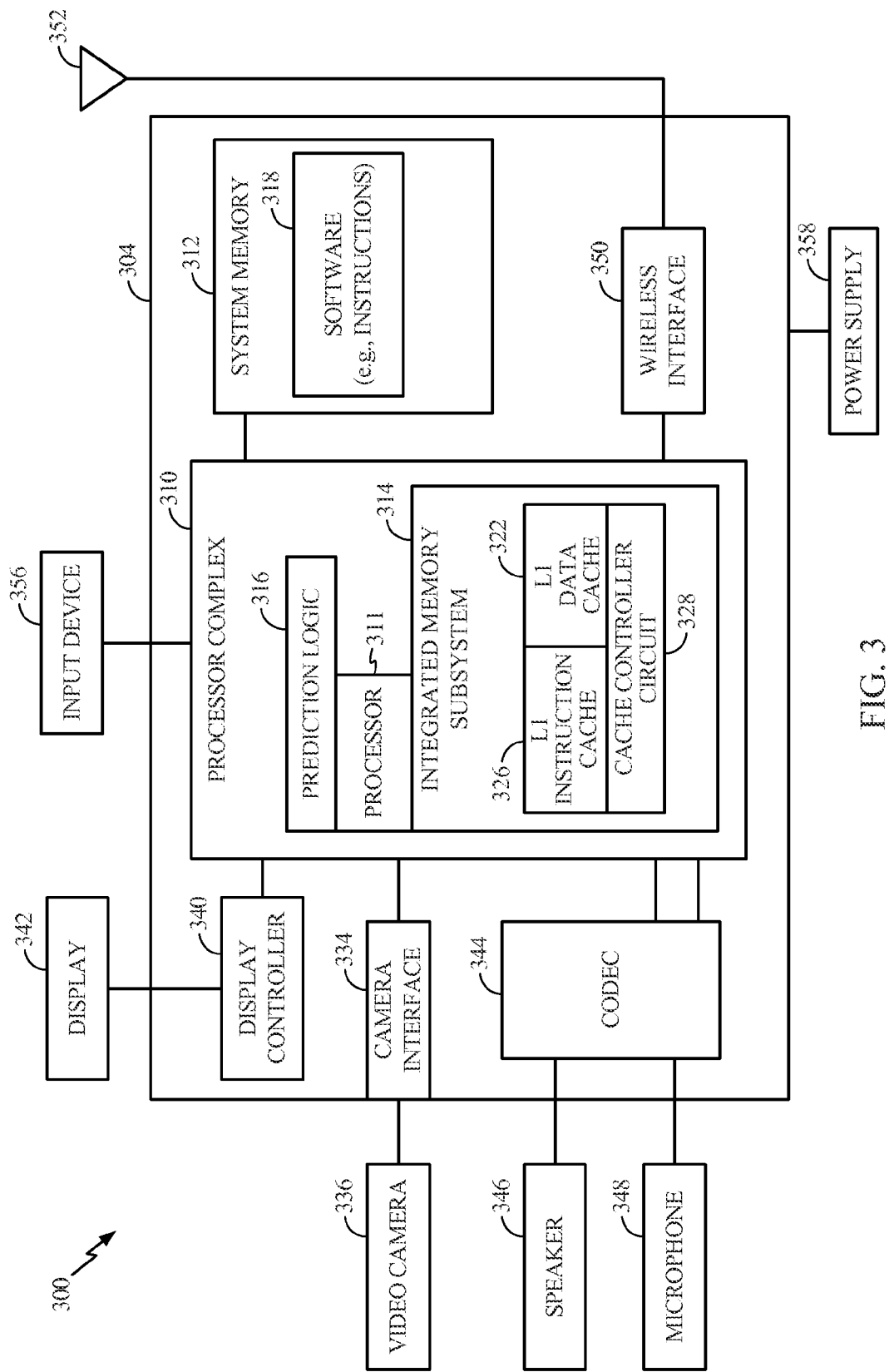
FIG. 3 illustrates a particular embodiment of a portable device having a processor complex that is configured to cancel selected pending data prefetch requests to reduce cache pollution.

FIG. 3 illustrates a particular embodiment of a portable device 300 having a processor complex that is configured to cancel selected pending data prefetch requests to reduce cache pollution. The device 300 may be a wireless electronic device and include the processor complex 310 coupled to a system memory 312 having software instructions 318. The system memory 312 may include the system memory 114 of FIG. 1. The processor complex 310 may include a processor 311, an integrated memory subsystem 314 having a level 1 data cache (L1 Dcache) 222, a level 1 instruction cache (L1 Icache) 326, a cache controller circuit 328, and prediction logic 316. The processor 311 may include the processor 110 of FIG. 1. The integrated memory subsystem 314 may also include a level 2 unified cache (not shown). The L1 Icache 326 may include the L1 Icache 124 of FIG. 1 and the L1 Dcache 322 may include the L1 Dcache 128 of FIG. 1.

The integrated memory subsystem 314 may be included in the processor complex 310 or may be implemented as one or more separate devices or circuitry (not shown) external to the processor complex 310. In an illustrative example, the processor complex 310 operates in accordance with any of the embodiments illustrated in or associated with FIGS. 1 and 2. For example, as shown in FIG. 3, the L1 Icache 326, the L1 Dcache 322, and the cache controller circuit 328 are accessible within the processor complex 310, and the processor 311 is configured to access data or program instructions stored in the memories of the integrated memory subsystem 314 or in the system memory 312.

A camera interface 334 is coupled to the processor complex 310 and also coupled to a camera, such as a video camera 336. A display controller 340 is coupled to the processor complex 310 and to a display device 342. A coder/decoder (CODEC) 344 may also be coupled to the processor complex 310. A speaker 346 and a microphone 348 may be coupled to the CODEC 344. A wireless interface 350 may be coupled to the processor complex 310 and to a wireless antenna 352 such that wireless data received via the antenna 352 and wireless interface 350 can be provided to the processor 311.

The processor 311 may be configured to execute software instructions 318 stored in a non-transitory computer-readable medium, such as the system memory 312, that are executable to cause a computer, such as the processor 311, to execute a program, such as the program process 200 of FIG. 2. The software instructions 318 are further executable to cause the processor 311 to process instructions that access the memories of the integrated memory subsystem 314 and the system memory 312.

In a particular embodiment, the processor complex 310, the display controller 340, the system memory 312, the CODEC 344, the wireless interface 350, and the camera interface 334 are included in a system-in-package or system-on-chip device 304. In a particular embodiment, an input device 356 and a power supply 358 are coupled to the system-on-chip device 304. Moreover, in a particular embodiment, as illustrated in FIG. 3, the display device 342, the input device 356, the speaker 346, the microphone 348, the wireless antenna 352, the video camera 336, and the power supply 358 are external to the system-on-chip device 304. However, each of the display device 342, the input device 356, the speaker 346, the microphone 348, the wireless antenna 352, the video camera 336, and the power supply 358 can be coupled to a component of the system-on-chip device 304, such as an interface or a controller.

The device 300 in accordance with embodiments described herein may be incorporated in a variety of electronic devices, such as a set top box, an entertainment unit, a navigation device, a communications device, a personal digital assistant (PDA), a fixed location data unit, a mobile location data unit, a mobile phone, a cellular phone, a computer, a portable computer, tablets, a monitor, a computer monitor, a television, a tuner, a radio, a satellite radio, a music player, a digital music player, a portable music player, a video player, a digital video player, a digital video disc (DVD) player, a portable digital video player, any other device that stores or retrieves data or computer instructions, or any combination thereof.

The various illustrative logical blocks, modules, circuits, elements, or components described in connection with the embodiments disclosed herein may be implemented or performed with a general purpose processor, a digital signal processor (DSP), an application specific integrated circuit (ASIC), a field programmable gate array (FPGA) or other programmable logic components, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing components, for example, a combination of a DSP and a microprocessor, a plurality of microprocessors, one or more microprocessors in conjunction with a DSP core, or any other such configuration appropriate for a desired application.

The methods described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of non-transitory storage medium known in the art. A non-transitory storage medium may be coupled to the processor such that the processor can read information from, and write information to, the non-transitory storage medium. In the alternative, the non-transitory storage medium may be integral to the processor.

The processor 110 of FIG. 1 or the processor 311 of FIG. 3, for example, may be configured to execute instructions including conditional non-branch instructions under control of a program stored on a computer readable non-transitory storage medium either directly associated locally with the processor, such as may be available through an instruction cache, or accessible through an I/O device, such as one of the I/O devices 140 or 142 of FIG. 1, for example. The I/O device also may access data residing in a memory device either directly associated locally with the processors, such as the Dcache 128, or accessible from another processor's memory. The computer readable non-transitory storage medium may include random access memory (RAM), dynamic random access memory (DRAM), synchronous dynamic random access memory (SDRAM), flash memory, read only memory (ROM), programmable read only memory (PROM), erasable programmable read only memory (EPROM), electrically erasable programmable read only memory (EEPROM), compact disk (CD), digital video disk (DVD), other types of removable disks, or any other suitable non-transitory storage medium.

While the invention is disclosed in the context of illustrative embodiments for use in processor systems, it will be recognized that a wide variety of implementations may be employed by persons of ordinary skill in the art consistent with the above discussion and the claims which follow below. For example, a fixed function implementation may also utilize various embodiments of the present invention.

What is claimed is:

1. A method for canceling prefetch requests, the method comprising:
   issuing cache prefetch requests in response to memory access instructions in a program loop;
   identifying a loop exit situation in the program loop based on an evaluation of program flow information; and
   canceling pending cache prefetch requests in response to the identified loop exit situation.

2. The method of claim 1, wherein the pending cache prefetch requests that are canceled do not include existing demand requests in the program loop.

3. The method of claim 1, wherein the loop exit situation is based on identifying a loop ending branch that evaluates to exit the program loop.

4. The method of claim 1, wherein the loop exit situation is based on an incorrect branch prediction which caused speculative instruction fetch and execution to be canceled.

5. The method of claim 1 further comprising:
   detecting a conditional branch instruction has resolved to end the program loop as the loop exit situation; and
   canceling pending prefetch requests except for demand prefetch requests in the program loop.

6. The method of claim 1 further comprising:
   detecting a conditional branch instruction has not resolved to end the program loop, wherein monitoring for the loop exit situation continues.

7. A method for canceling prefetch requests, the method comprising:
   speculatively prefetching data with data prefetch requests according to a called function in a program loop; and
   canceling pending data prefetch requests in response to a function exit from the called function.

8. The method of claim 7, wherein existing demand requests in the program loop are not canceled.

9. The method of claim 7, wherein the function exit is based on detecting execution of a return from the called function.

10. The method of claim 7, wherein the function exit is based on detecting speculative execution of a return from the called function.

11. An apparatus for canceling prefetch requests, the apparatus comprising:
    a loop data address monitor configured to determine a data access stride based on repeated execution of a memory access instruction in a program loop;
    data prefetch logic configured to speculatively issue prefetch requests based on memory access instructions in the program loop according to the data access stride; and
    a stop prefetch circuit configured to cancel pending prefetch requests in response to an identified loop exit.

12. The apparatus of claim 11, wherein the loop data address monitor comprises:
    a stride circuit configured to monitor the repeated execution of the memory access instruction to determine a difference in an operand address for each execution of the memory access instruction, wherein the difference in the operand address is a stride address value; and
    an add function circuit configured to add the stride address value to the operand address of a most recently executed memory access instruction to determine a next operand address.

13. The apparatus of claim 11, wherein existing demand requests in the program loop are not canceled.

14. The apparatus of claim 11, wherein the identified loop exit is based on identifying a loop ending branch that evaluates to exit the program loop.

15. The apparatus of claim 11, wherein the identified loop exit is based on an incorrect branch prediction which cancels speculative instruction fetch and execution.

16. The apparatus of claim 11, wherein the stop prefetch circuit is further configured to detect a conditional branch instruction has resolved to end the program loop as the identified loop exit and to cancel pending prefetch requests except for demand prefetch requests.

17. The apparatus of claim 11, wherein the stop prefetch circuit is further configured to detect a conditional branch instruction has not resolved to end the program loop and wherein the program loop continues until the identified loop exit is identified.

18. The apparatus of claim 11, wherein the stop prefetch circuit is further configured to not cancel pending prefetch requests in the program loop based on a weakly predicted loop exit.

19. A computer-readable non-transitory medium encoded with computer-readable program data and code, the computer-readable program data and code when executed operable to:
- issue cache prefetch requests in response to memory access instructions in a program loop;
- identify a loop exit situation in the program loop based on program flow information; and
- cancel pending cache prefetch requests in response to the identified loop exit situation.

20. An apparatus for canceling prefetch requests comprising:
- means for determining a data access stride based on repeated execution of a memory access instruction in a program loop;
- means for speculatively issuing prefetch requests in response to memory access instructions in the program loop according to the data access stride; and
- means for canceling pending data cache prefetch requests in response to an identified loop exit.

* * * * *